United States Patent [19]
Vig et al.

[11] 4,388,980
[45] Jun. 21, 1983

[54] OPERATOR RESTRAINT FOR A LOADER

[75] Inventors: Michael A. Vig; Donald K. Schmidt, both of Bismarck, N. Dak.

[73] Assignee: Clark Equipment Company, Buchanan, Mich.

[21] Appl. No.: 228,535

[22] Filed: Jan. 26, 1981

[51] Int. Cl.³ .............................................. B60R 21/10
[52] U.S. Cl. .................................... 180/271; 180/269; 192/129 R; 280/751; 414/699
[58] Field of Search ...................... 180/6.48, 271, 272, 180/273, 268, 269, 287, 286, 289; 280/751, 748, 753; 296/153, 152, 84 K; 297/487, 488; 49/394; 104/241; 105/308 C, 276; 410/143, 152, 134, 137; 414/480, 699; 192/129 R

[56] References Cited

U.S. PATENT DOCUMENTS

| | | | |
|---|---|---|---|
| 2,755,101 | 7/1956 | Budde | 280/748 |
| 2,949,299 | 8/1960 | Keith | 297/487 |
| 3,431,995 | 3/1969 | Kiernan | 180/268 |
| 3,453,026 | 7/1969 | Paes et al. | 297/487 |
| 3,494,633 | 2/1970 | Malloy | 296/84 K |
| 3,993,157 | 11/1976 | Schulte | 180/286 |
| 4,122,631 | 10/1978 | Batcheller | 49/394 |
| 4,260,320 | 4/1981 | Steiger | 414/680 |

OTHER PUBLICATIONS

"Bobcat Loader 533, 631, 731 Europe Export Kit" brochure, Reference No. 6561016 dated 8-80 consisting of 8 pp.
"Bobcat Loader 310, 313 Europe Export Kit" brochure, Reference No. 6561041, undated and consisting of 9 pp.
"HMI Hydra-Mac, Inc. Model 14C" advertisement, undated and consisting of 2 pp.

Primary Examiner—David M. Mitchell
Attorney, Agent, or Firm—Mack L. Thomas; Harry G. Thibault

[57] ABSTRACT

A front end loader in the form of a skid-steer loader which includes a power operated working implement and control apparatus that has a plurality of operative positions for supplying power to the working implement and at least one neutral position where power cannot be supplied to the working implement. The control apparatus is capable of being manipulated by the operator of the loader to place the control apparatus in any one of the selected operative positions or the neutral position. An operator restraint member has two ends and is pivotally mounted on the skid-steer loader at one of its ends. The restraint member is swingably movable between an engaged position for securing the operator to the operator position during rough ride conditions and a disengaged position to permit the operator to enter or leave the loader. A latch is provided to selectively secure the restraint bar in the engaged position. A locking assembly is engaged with the control apparatus when the restraint member is in its disengaged position and is disengaged from the control apparatus when the restraint member is in its engaged position.

9 Claims, 4 Drawing Figures

OPERATOR RESTRAINT FOR A LOADER

CROSS REFERENCES

U.S. patent applications filed simultaneously herewith, one in the names of Carman P. Lynnes et al entitled "Loader Operator Restraint System", Ser. No. 228,536, filed Jan. 26, 1981, and the other in the names of Henry J. Weber et al. entitled "Loader Operator Restraint", Ser. No. 228,534, filed Jan. 26, 1981, both assigned to the assignee of the present invention.

BACKGROUND OF THE INVENTION

1. Field of the Invention

The field of art to which this invention pertains includes front end loaders and more specifically to safety features for front end loaders.

2. Description of the Prior Art

Front end loaders often include a cab portion having an operator seat from which the loader is operated and from which the operator can control the various functions of the loader. Some types of front end loaders are expected to go over rough terrain, make sudden stops and turns and are subject to sudden tilting and lurching. Roll Over Protection Structures (ROPS) and/or seat belts are customarily provided to lower the possibility of injury during the above-described rough ride conditions. It is preferable that the operator use his seat belt under these conditions to avoid an enhanced possibility of injury or being thrown from the vehicle.

A skid-steer loader is a type of front end loader in which the operator often encounters rough ride conditions. Skid-steer loaders are commonly provided with a front entry Roll Over Protection Structure (ROPS) and a seat belt.

In Hydra-Mac, Inc.'s skid-steer loader the front entry is provided with a two section gate that has a closed position for blocking the front entry and an open position where the gate sections act as obstructions in the path of the boom arms. It should be noted that the operator in this loader is prevented from being thrown from the cab portion when the gate is in its closed position but is not prevented from undue movement in the cab portion during rough ride conditions.

Another known prior art safety feature provided on skid-steer loaders is manufactured by the Assignee of the present invention and includes two types of manually actuated mechanical locks on the foot pedal linkage controlling the boom arms. Both of these mechanical locks are not connected with any other safety feature.

SUMMARY OF THE INVENTION

This invention provides safety apparatus that has a lower position that not only blocks the front entry of the front end loader but also maintains the operator in his seat and inside of the cab during rough ride conditions. Moreover, the safety apparatus has a raised position wherein the operator is prevented from operating the hydraulics to raise or lower the boom arms or tilt the bucket of the loader. Therefore, the operator must place the safety apparatus in its lower position in order to raise or lower the boom arms or tilt the bucket of the loader.

The safety apparatus includes a seat bar which is pivotally connected at one of its ends to the loader at one of the vertical side posts of the front opening of the cab portion of the loader. The seat bar rotates about a horizontal axis defined by the axially aligned connection point for the seat bar on the side post. When the seat bar is in its protect position the middle portion of the seat bar holds and retains the operator in the cab seat and prevents undue operator movement during rough ride conditions. When the seat bar is in its passage position operator entrance and egress is permitted from the front opening of the loader. A latch is mounted on the other side post on the other side of the front opening for receiving the other end of the restraint bar when the restraint bar is in its protect position.

A locking assembly includes an elongated rod connected with the restraint bar on one end and in operative association with the crank of a crank shaft on the other end. The rod moves downwardly when the restraint bar is shifted from its passage position to its protect position and moves upwardly when the restraint bar is shifted from its protect position to its passage position. The crank moves with the lower end of the rod. The crank is connected to a crank shaft and a cover plate is mounted on the crank shaft and is rotatable with the crank shaft. The cover plate has a slot and is positioned on the crank shaft so that collar elements on control linkages that operate between foot pedals and hydraulic controls for supplying hydraulic power to raise and lower boom arms are selectively received in the slot. The crank shaft and cover plate mounted thereon have a first rotative position when the restraint bar is in its protect position and a second rotative position when the restraint bar is in its passage position, the collar elements being received in the slot when the crank shaft and cover plate are in their second rotative position.

The cab portion of the loader can be tilted up and lifted away from the frame portion of the vehicle to permit ease of servicing of drive components contained in the vehicle frame. The seat bar is mounted on the cab portion of the loader and the locking members are mounted on the frame of the vehicle so that the seat bar moves with the cab portion when it is tilted up and away from the frame.

DETAILED DESCRIPTION OF THE PREFERRED EMBODIMENT

Figure 1:
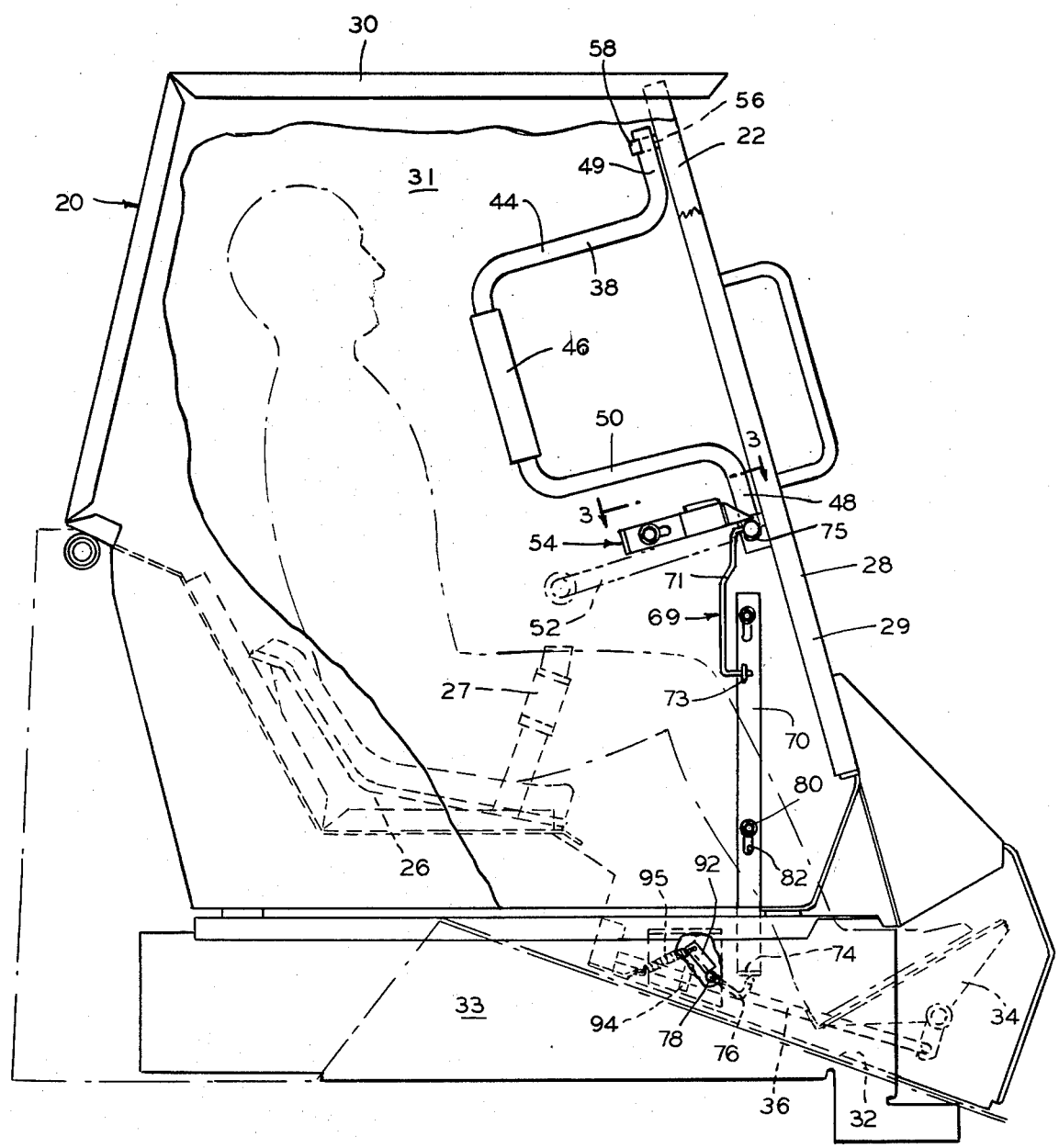
FIG. 1 is a side view of a skid-steer loader with the right hand side post partially broken away to reveal the restraint bar, locking member and latches of the present invention.

A front end loader illustrated in this embodiment as a skid-steer loader 20 is shown in FIG. 1. The skid-steer loader 20 includes a Roll Over Protection Structure (ROPS) 22 provided with a front entry and egress opening 24. The ROPS also serves as the cab portion of the skid-steer loader 20. An operator seat 26 is provided inside the cab portion 20 and has a seat belt 27. The front entry 24 is bounded on each vertical side by a side post 28, at the top by roof portion 30, and at the bottom by floor portion 32 of the frame 33 of the skid-steer loader 20. Each of the side posts 28 is comprised of a plurality of side walls 29.

Figure 2:
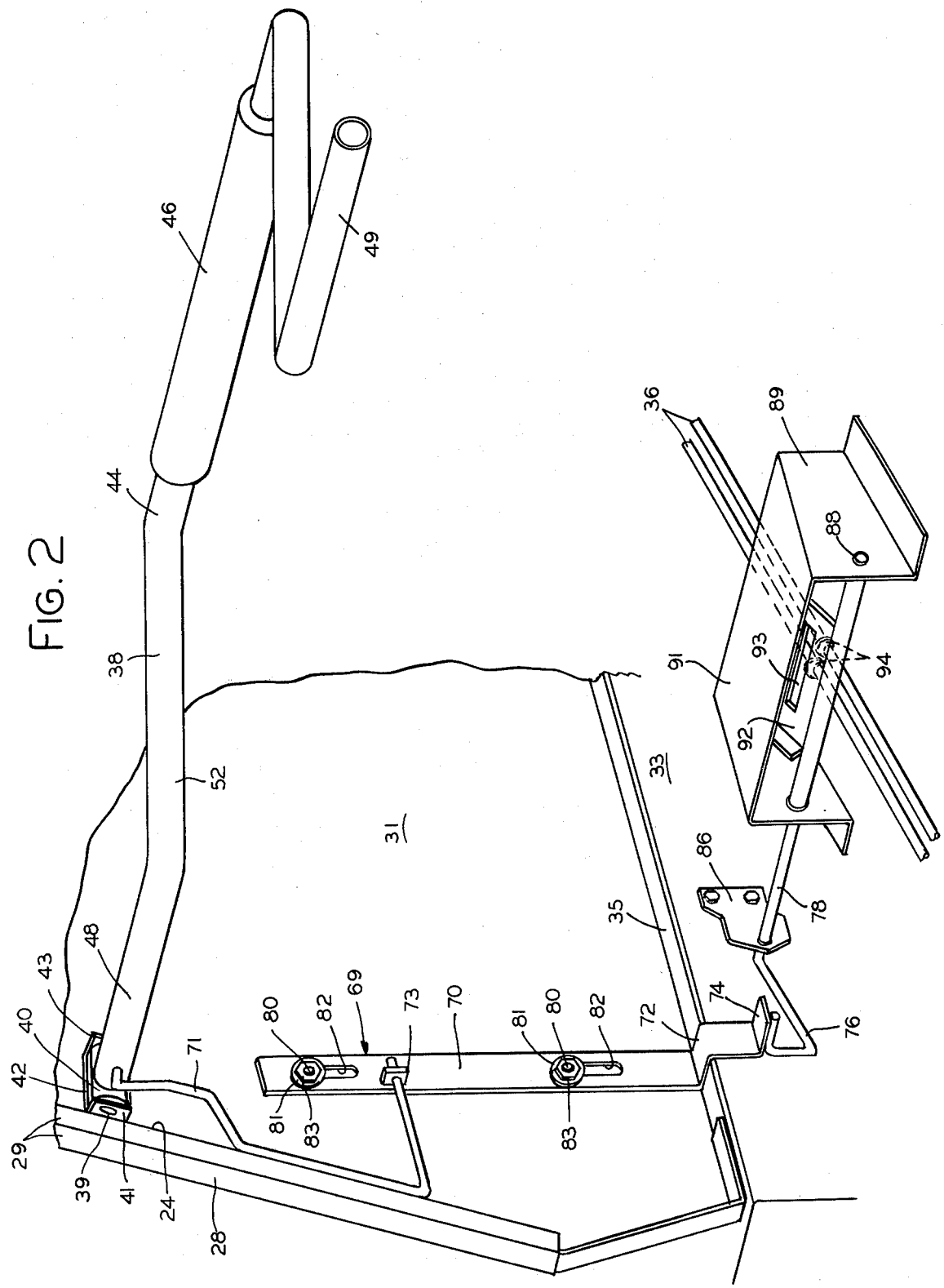
FIG. 2 is a perspective view of the restraint bar, locking member and associated control linkages as shown in the skid-steer loader illustrated in FIG. 1.

Skid-steer loader 20 also includes a pair of conventional foot pedals 34 and associated control linkages 36. One of the control linkages 36 operates between the foot pedal and the hydraulic control (not shown) for supplying hydraulic fluid to raise and lower the boom arms in the conventional fashion. The other foot pedal 34 is connected to its associated control linkage 36 which operates between the foot pedal and hydraulic control (also not shown) for controlling the inclination or tilt of the bucket (not shown) of the skid-steer loader 20. The control linkages 36 as shown in FIGS. 1 and 2 are constructed and function in a manner well known in the prior art. However, it should be briefly noted that the foot pedals 34 and associated control linkages 36 return to a neutral position when the foot pedal is not being depressed by the foot of the operator.

As shown in FIG. 1 a seat bar 38 has a generally vertical passage position 50 shown in solid lines and a generally horizontal operator protect position 52 shown in dotted lines. When seat bar 38 is in its operator protect position a U-shaped middle portion as best shown in FIG. 1 curves inwardly towards the operator. The seat bar 38 which is shown both in FIGS. 1 and 2 is in the form of a cylindrical tube having the U-shaped middle portion 44 spaced between integrally connected inline end portions 48 and 49. The mounting of the seat bar 38 to the loader 20 includes a cross tube bushing 40 attached to the outer tip of end portion 48. The cross tube bushing 40 is received in an inwardly open channel member 42 rigidly mounted on a side wall 29 of the side post 28 to the right hand side of the operator when he is in the cab seat 26. The channel member 42 includes opposed channel side walls 43 having aligned openings 41. A pin 39 is inserted through cross tube 40 and the aligned openings 41 in the channel side walls 43 so that seat bar 38 is pivotally mounted for swinging movement on channel member 42.

The middle portion 44 of seat bar 38 is adjacent to the operator when the seat bar is in its protect position. A sheet of resilent material is wrapped around the middle portion 44 of the seat bar 38. Opposed ends of the resilent material are sealed together by use of a Velcro strip (not shown) to form a cylindrical resilent outer surface 46 for seat bar 38 as shown in FIGS. 1 and 2. The resilent outer surface 46 provides operator comfort as an arm rest and also acts as a safety feature to cushion the operator in possible impact with the seat bar 38. It should be noted that the exact configuration and mounting of the seat bar 38 may be modified as desired and still stay within the scope of the present invention as long as the seat bar has an operator protect and an operator passage position.

The operator may retain the seat bar 38 in the operator passage position 50 by placing the end portion 49 in engagement with an upper latch 56 mounted above the channel 42 on right hand side wall 31. The upper latch 56 has a hook portion 58 for receiving the outer end 49 of the seat bar 38 when the seat bar is in its passage position 50. A lower latch mechanism 54 secures the seat bar end 49 of the seat bar 38 in its protect position. The latch mechanism 54 is partially mounted on the side post 28 to the left hand side of the operator when he is in the cab seat 26 and is aligned with the channel member 42. The latch 54 as shown in detail in FIGS. 3 and 4 includes a hook element 75 mounted on the left hand side post 28 for receiving the seat bar end 49 when the seat bar 38 is in its protect position. A latch-lock element 60 is slidably mounted to the left hand side of the screen area 55 of the cab portion by a pair of nut and bolt assemblies 62 received in a pair of longitudinal slots 63 in the main body portion 68 of latch-lock element 60. The latch-lock element 60 is partially contained in a housing 64. Also contained in housing 64 is a coil spring 66 which operates between the end wall 65 of the housing 64 and a section 67 bent at a 90 degree angle away from the main body portion 68 of the latch-lock element 60. The front end 53 of the latch-lock element 60 is bent at a second 90 degree angle away from the bent section 67 and is parellel to the main body portion 68. The front end section 53 of the latch-lock element 60 has a downwardly sloped edge surface 61 and a lower seat bar retaining edge surface 59 that is selectively positioned above the hook element 75 when the end portion 49 of the seat bar 38 is received in the hook element 75. The latch-lock element 60 also includes a rear handle section 57 parallel to the bent portion 67. The retaining edge 59 of the front end of the latch-lock element 60 may be moved away from the hook portion 75 by the operator when he desires to lock the seat bar 38 in its protect position or to remove the seat bar 38 when it is already locked in its protect position.

Figure 3:
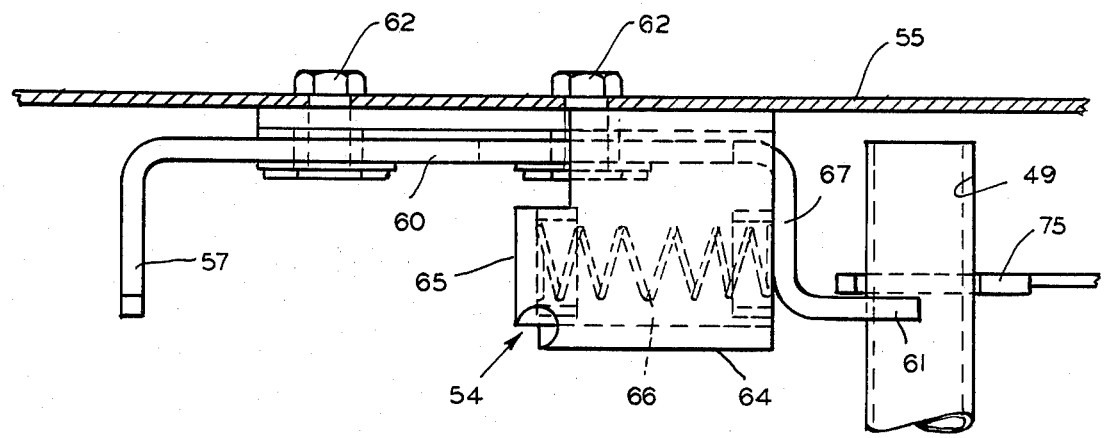
FIG. 3 is a plan view of the lower latch member illustrated in FIG. 1.
Figure 4:
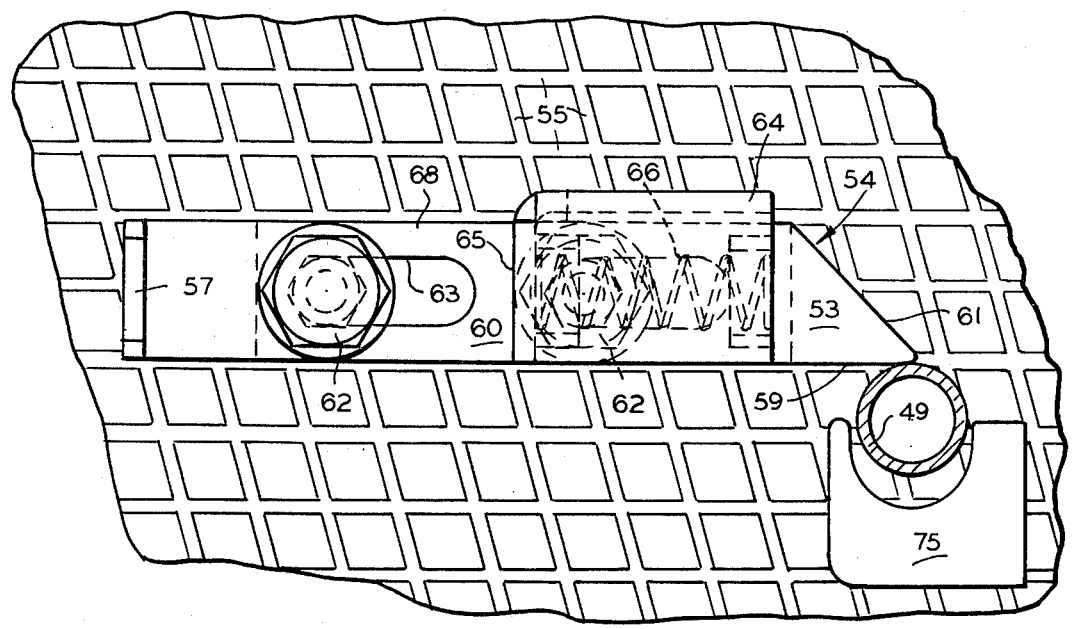
FIG. 4 is a side view of the lower latch member illustrated in FIG. 4.

A locking assembly 69 as best shown in FIG. 2 is provided for jointly locking both control linkages 36 in their neutral positions when the seat bar 38 is not in its protect position so that the operator cannot raise or lower the boom arms or tilt the loader bucket without first placing the seat bar in its protect position. The locking assembly includes a rod 71 connected at its top end to the seat bar end 48 adjacent cross tube 40. The lower end of rod 71 is connected to a locking member 70 which is in the form of an upwardly disposed metal strip that has a rigidly attached projecting tab 73 having an opening therethrough for receiving the lower end of the locking rod 71. The locking rod 71 and thus the locking member 70 move upwardly when the seat bar 38 moves from its protect position to its passage position and moves downwardly when the seat bar 38 moves from its passage position to its protect position. Upper and lower projecting bolt ends 80 are attached to and inwardly extend from the right hand side of the frame 33 of the skid-steer loader 20 below and to the front of the operator seat 26 as viewed in FIG. 1. The projecting bolt ends 80 are received in longitudinal slots 82 in locking member 70 so that the locking member 70 is slidably mounted for vertical movement on the frame 33. A washer 81 and nut 83 are also mounted on each of the projecting bolt ends 80 behind the associated locking member 70 for securing it to the frame 33. The locking member 70 has a step portion 72 which rests upon a ledge portion 35 of the right hand side of frame 33 when the locking member is in its downward most position as shown in FIG. 3. The step portion 72 is spaced above the shelf portion 35 when the locking member is raised from its downward most position shown in FIG. 3, i.e., when the seat bar 38 is moved from its protect position to the passage position.

The bottom of locking member lower end 74 is in contact with a crank 76 integrally connected to a crank shaft 78. A cover plate 92 is rigidly mounted on the crank shaft 78 for rotation therewith. The crank shaft 78 is supported by a guide bracket 86 and aligned openings 88 in spaced apart side walls 89 of a bracket housing 91. Both guide brackets 86 and bracket housing 91 are secured to the frame 33. A cover plate 92 is mounted on the crank shaft 78 for rotation therewith and has a raised first rotative position and a lower second rotative position. Cover plate 92 includes a longitudinal slot 93. It should be noted that the control linkages 36 pass underneath bracket housing 91 and specifically pass underneath crank shaft 78 and cover plate 92. A collar element 94 is mounted on each of the control linkages 36 and is positioned on each of the control linkages to be received in the longitudinal slot 93 of cover plate 92 when it is in its lower second rotative position. A spring 95 is connected to the top edge of cover plate 92 as shown in FIG. 1 to aid gravity in biasing the cover plate in a downward direction toward its lower second rotative position.

OPERATION

When the seat bar 38 is raised to its vertically disposed passage position 50 the outer end 49 of the seat bar is received in the upper latch 56 and seat bar end 49 is moved vertically upwardly from the position shown in FIG. 2 so that locking rod 71 and locking member 70 are moved upwardly and therefore crank 76 will also move upwardly as it rotates in a clockwise direction. As the crank shaft rotates in a clockwise direction as viewed in FIG. 2 the cover plate will rest upon the linkages 36 and the collars 94 will be received in the longitudinal slot 93 to lock the control linkages in their neutral position.

For the seat bar 38 to be swingably pivoted from its passage position 50 to its generally horizontally disposed protect position 52, the seat bar 38 is swung in a downward direction until the outer end 49 of seat bar 38 is in abutment with the surface 61 on latch-lock element 60. Then the operator can by rearwardly pulling the handle 57 of latch lock 60 place the outer end 49 in the hook portion 75 of the latch 54. The handle 57 can then be released so that the retaining edge 59 of the latch-lock element 60 prevents the seat bar outer end 41 from being inadvertently displaced from the hook portion. However, the operator by rearward movement of handle 57 can withdraw the latch-lock element 60 from its overlying position and manually reposition the seat bar 38.

When the seat bar 38 is in its illustrated FIG. 2 protect position the rod 71 has moved downwardly from its position in the above-described passage position causing resultant downward movement on the locking member 70 so that step portion 72 of locking member 70 is resting upon the shelf portion 35 of frame 33. Additionally, the downward movement of the lower end 74 of the locking member has caused the crank 76 to rotate counterclockwise in a downward direction so that the cover plate 92 rotates from its position at rest on top of the control linkages to an upward raised second rotative position so that the collars 94 are spaced from the slot 93 in cover plate 92. Then the operator of the loader will be able by manipulation of foot pedals 34 to adjust the control linkages to supply power to both the boom arms and bucket tilt functions of the loader.

From the foregoing it is believed that those familiar with the art will readily recognize and appreciate the novel concepts and features of the present invention. Numerous variations, changes and substitutions of equivilents will present themselves to people skilled in the art and may be made without necessarily departing from the scope and principles of this invention. As a result, the embodiment described herein is subject to various modifications, changes and the like, with the scope of this invention being determined solely by reference to the claims appended hereto.

What is claimed is:

1. A loader including:
   a power operated working implement;
   a control apparatus having a plurality of operative positions for supplying power to the working implement and at least one neutral position where power is not supplied to the working implement, the control apparatus capable of manipulation by the operator of the loader for placing the control apparatus in any one of the operative or neutral positions;
   a cab portion having a front opening for operator entrance and egress;
   an operator position from which the operator may manipulate the control apparatus, the operator position being located in the cab portion;
   the control apparatus including at least one control linkage operating between an operator's foot pedal and a hydraulic control for supplying the power to the working implement;
   an operator restraint bar having two ends, at one of its ends the restraint bar is pivotally connected to the cab portion adjacent the front opening for swinging movement between a protect position for securing the operator during rough ride conditions and a passage position spaced from the protect position where the operator can enter or leave the loader;
   a locking assembly for selectively locking the control apparatus in a neutral condition, the locking assembly being in locking engagement with the control apparatus when the restraint bar is in its passage position;
   the locking assembly including a locking member connected with the restraint bar, the locking member having a lower end that is moved downwardly when the restraint bar is moved from its passage position to its protect position and moved upwardly when the restraint bar is moved from its protect position to its passage position;
   a crank in operative association with the locking member and movable in a downward direction in response to downward movement of the locking member and movable in an upward direction in response to upward movement of the locking member;
   a crank shaft connected to the crank and rotatable in a first rotative direction in response to downward movement of the crank and rotatable in a second rotative direction in response to upward movement of the crank; and
   a member mounted on the crank for rotation therewith, the member having a selectively engageable means for locking engagement with the control linkage, the locking means being in engagement with the control linkage when the restraint bar is in its passage position.

2. The loader as claimed in claim 1 wherein the locking assembly is disengaged from the control apparatus when the restraint bar is in its protect position so that the operator is able to manipulate the control apparatus to a desired operative position.

3. The loader as claimed in claim 1 wherein the member is a cover plate rotatable with the crank shaft and the locking means includes a slot in the cover plate and a collar element mounted on the control linkage, the cover plate having two rotative positions, the cover plate being it its first rotative position when the restraint bar is in its protect position and being in its second rotative position spaced from the first rotative position when the retraint bar is in its passage position, and the cover plate being positioned so that the collar element on the control linkage is received in the slot in the cover plate in the second rotative position of the cover plate.

4. The loader as claimed in claim 3 wherein the cover plate is supported from the force of gravity in its second rotative position and is rotated upwardly against the force of gravity when the cover plate is rotated from the second rotative position to the first rotative position whereby the force of gravity urges the crank shaft and the cover plate from the first rotative position to the second rotative position.

5. The loader as claimed in claim 3 wherein a second control linkage is provided and a second collar element is mounted on the second control linkage, and further wherein the second collar is received in the slot in the cover plate when the cover plate is in its second rotative position.

6. The loader as claimed in claim 1 further comprising a latch for securing the other end of the restraint bar to the cab portion when the restraint bar is in its protect position.

7. The loader as claimed in claim 6 wherein the latch includes a hook element having a curved portion for receiving the other end of the restraint bar when the restraint bar is in its protect position and a lock element spring biased to a position over the hook element and capable of movement to a noninterference position spaced from the hook element.

8. The loader as claimed in claim 7 wherein the restraint bar is generally horizontally disposed in its protect position and generally vertically disposed in its passage position.

9. The loader as claimed in claim 8 further comprising an upper latch mounted on the cab portion for selectively securing the restraint bar in its passage position.

* * * * *